Patented Mar. 29, 1932

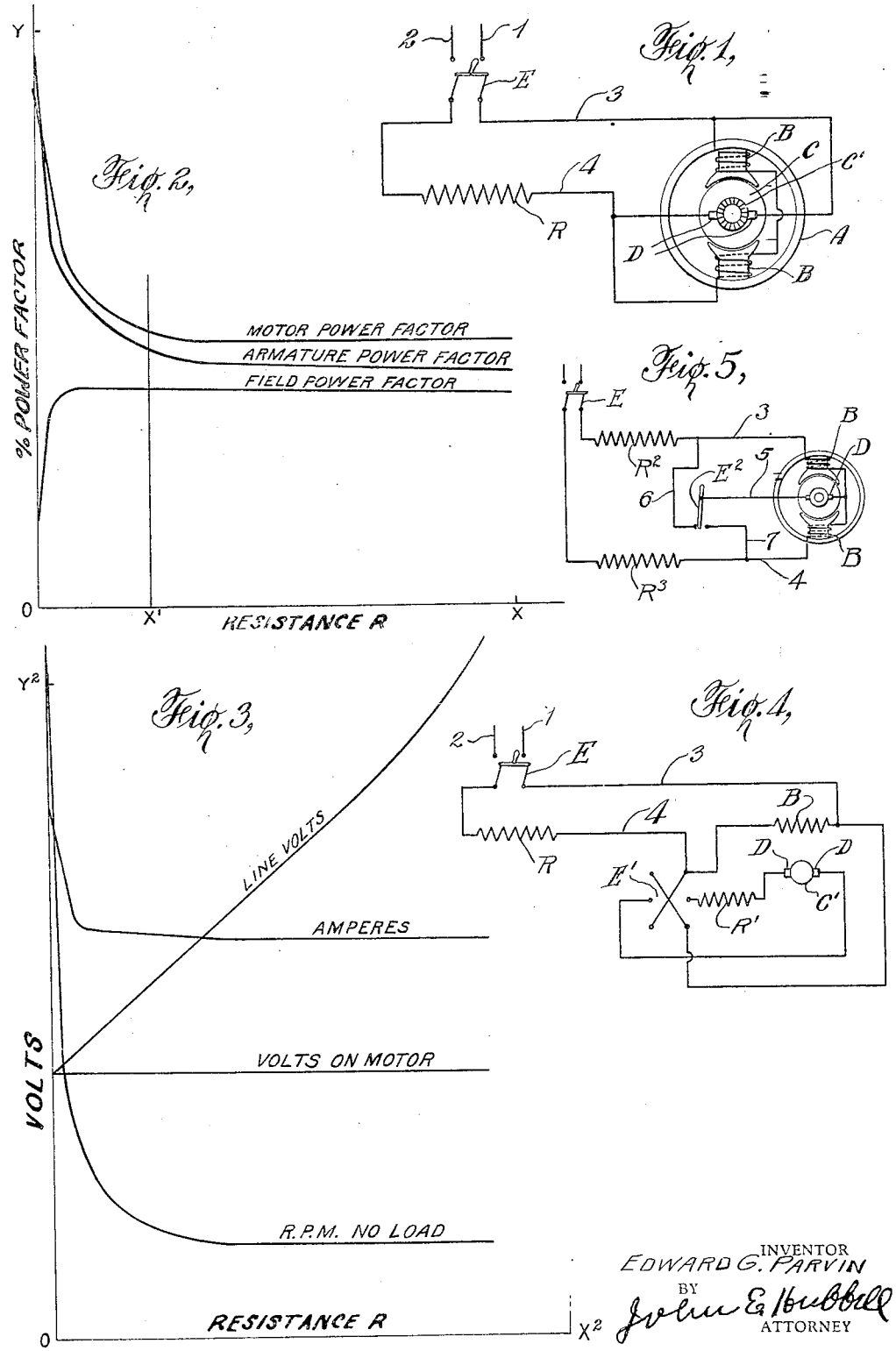

1,851,591

UNITED STATES PATENT OFFICE

EDWARD G. PARVIN, OF ROSELLE, NEW JERSEY, ASSIGNOR TO ZOBELL ELECTRIC MOTOR CORPORATION, OF GARWOOD, NEW JERSEY, A CORPORATION OF NEW YORK

ALTERNATING CURRENT MOTOR

Application filed June 21, 1927. Serial No. 200,324.

The present invention consists in an alternating current motor arrangement devised with the general object of insuring some or all of the following characteristics, namely: operation at widely different speeds, and under widely different loads, a desirable and safe maximum no load speed, a motor torque which is practically at maximum at starting and which diminishes as the speed increases through the normal range, and all without objectionable sparking. To this end I employ a simple shunt wound alternating current motor of the commutating type, and connect a resistance in series with the armature and field windings of the motor, which is adapted to materially increase the power factor of the motor field winding, while at the same time diminishing the power factor of the armature winding, and which increases the effective reaction between the armature and field windings.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of the invention.

In the drawings:

Fig. 1 is a diagrammatic representation of one embodiment of my invention;

Fig. 2 is a diagram illustrating power factor relations;

Fig. 3 is a diagram illustrating voltage and speed characteristics;

Fig. 4 is a diagram illustrating modifications of the motor arrangement shown in Fig. 1; and Fig. 5 is a diagram illustrating another modification.

In Fig. 1, A represents a motor shown as a simple bipolar commutating motor having a field winding comprising a coil B on each motor pole, and an armature C with ordinary direct current windings connected in the usual manner to a commutator C', against diametrically opposed portions of which brushes D bear. The field winding coils B are connected in series with one another between terminal conductors 3 and 4. One of the brushes D is connected to the conductor 3 and the other brush is connected to the conductor 4, so that the armature and field windings are connected in parallel with one another between the conductors 3 and 4. 1 and 2 represent supply conductors to which the conductors 3 and 4 may be respectively connected by a switch E. R represents a resistance in series with the armature and field windings. As shown, the resistance R is included in the conductor 4.

The effect on the power factor relations of a variation in the amount of resistance R in series with the armature and field windings of the motor shown in Fig. 1, is illustrated in Fig. 2, wherein the armature, field and motor power factors at no load are represented by appropriately designated curves. In Fig. 2, abscissæ measured along the line O—X represent different values of the resistance R, and ordinates measured along the line O—Y represent power factor percentages. It will be observed that as the value of the resistance R increases from zero through a small range, there is a rapid and approximately proportional increase in the field power factor, and that as the value of the resistance R is increased through a further small range, the power factor continues to increase but at a diminishing rate, and that still further increases in the resistance R have practically no effect on the field power factor. As the resistance R increases from zero there is an initial rapid decrease in the power factors of the armature and of the motor as a whole, followed by more moderate decreases in these two power factors as the resistance is further increased through small ranges, and as the resistance is still further increased, there is practically no further change in the motor and armature power factors.

As illustrated in Fig. 2, the horizontal portion of the field power factor curve corresponds to a power factor of about 38%, and the horizontal portion of the motor power factor curve corresponds to a power factor of about 46%, but it will be understood that these percentages are given by way of illustration and not of limitation and that quite different percentages may be obtained with different motor arrangements and operating conditions. With the motor and the operating conditions to which the power factor diagram of Fig. 2 applies, I consider it desirable that the value of the resistance employed should be approximately that indicated by the distance O—X'. With that value, the difference between the armature and field power factors is but little above the minimum to which said difference can be reduced by further increases in the value of the resistance R, and the armature and field reactions approach a maximum. The advantages of increasing the value of the resistance R beyond that represented by O—X' under these circumstances are ordinarily not sufficient to compensate for the increased power consumption by the resistance R.

In Fig. 3 I have illustrated diagrammatically the variations in the line voltage, motor current, and no load motor speed of the motor to which the diagram 2 pertains, when the value of the resistance R is varied and the line voltage is simultaneously varied to maintain a constant potential difference between the conductors 3 and 4. In Fig. 3 the different values of the resistance R are represented by abscissæ measured along the lines O—X², and the line voltage, motor current strength, and motor speeds are represented by ordinates measured along the line O—Y².

While the new motor arrangement may be used with advantage under widely different conditions, it is of especial utility when used for opening and closing the doors of passenger cars and buildings. In such use, with a properly proportioned resistance R in series with the armature and field windings of the motor it is possible to make the motor torque a practical maximum when the motor is started, and to make the motor torque diminish as the speed of the motor is increased to a maximum, and to limit the door closing speed to a safe maximum.

It will be understood, of course, that the invention is not limited to any such details of the motor arrangement shown in Fig. 1 as the number of pairs of motor poles or brushes, and that in some cases either the field or the armature winding, and particularly the latter, or both, may have resistance connected in series with it which is not in series with the other winding. For example, as shown in Fig. 4, a resistance R' is connected in series with the armature in a portion of the motor circuit individual to the armature. The invention, however, requires that there must be a resistance, such as the resistance R, with which both the armature and the field winding are in series. In such a use as that mentioned above for operating car doors, the motor must be reversible, and in Fig. 4 I have illustrated diagrammatically a two-pole double-throw reversing switch E' for interchangeably connecting either motor brush to the conductor 3 while simultaneously connecting the other motor brush to the conductor 4.

In Fig. 5 I have illustrated a modification in which the two field coils B of a bipolar motor are connected in series with one another between the conductors 3 and 4, and a reversing switch E² in connection with conductors 5, 6 and 7 forms a means for connecting the armature in shunt with either field coil. With this arrangement when the switch E² is in position to connect the armature in shunt with one of the field coils, the other field coil constitutes an impedance having comparatively little effect on the operation of the motor. As shown in Fig. 5, there is a resistance R² in the conductor 3, and a resistance R³ in the conductor 4, but it will be readily apparent that if the two resistances R² and R³ were both located in the conductor 3 or in the conductor 4 the operation of the arrangement shown in Fig. 5 would not be altered.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. The combination with a source of alternating current, of a commutating motor having main armature and main field windings which in normal operation are connected in parallel with one another to said source, and a common resistance in series with each of said windings and said source.

2. A commutating alternating current motor, comprising main armature and main field windings which in normal operation are connected in parallel with one another to the same source of alternating current, and a common resistance in series with each of said windings and so proportioned as to make the difference between the no load power factors of said windings relatively small.

3. A commutating alternating current motor comprising main armature and main field windings which in normal operation are connected in parallel to the same source of alternating current, and a common resistance for increasing the reaction between the armature and field windings, connected in series with each of said windings, and of a value large enough to insure an approximation toward the maximum value of said reaction obtainable by use of such a resistance.

Signed at Garwood, in the county of Union and State of New Jersey, this 18th day of June, A. D. 1927.

EDWARD G. PARVIN.